(12) United States Patent
Ellersiek

(10) Patent No.: US 9,421,571 B2
(45) Date of Patent: Aug. 23, 2016

(54) PROCESS FOR PRODUCING INSULATED JACKETED PIPES BY A CONTINUOUS PRODUCTION PROCESS

(71) Applicant: Carsten Ellersiek, Lengerich (DE)

(72) Inventor: Carsten Ellersiek, Lengerich (DE)

(73) Assignee: BASF SE, Ludwigshafen (DE)

( * ) Notice: Subject to any disclaimer, the term of this patent is extended or adjusted under 35 U.S.C. 154(b) by 787 days.

(21) Appl. No.: 13/684,976

(22) Filed: Nov. 26, 2012

(65) Prior Publication Data

US 2013/0133777 A1  May 30, 2013

Related U.S. Application Data

(60) Provisional application No. 61/563,854, filed on Nov. 28, 2011.

(51) Int. Cl.
| | | |
|---|---|---|
| *B29C 39/18* | (2006.01) | |
| *B05D 1/26* | (2006.01) | |
| *F16L 9/14* | (2006.01) | |

(Continued)

(52) U.S. Cl.
CPC .............. *B05D 1/265* (2013.01); *B29C 39/18* (2013.01); *B29C 67/246* (2013.01); *B32B 1/08* (2013.01); *B32B 15/046* (2013.01); *B32B 27/065* (2013.01); *B32B 27/32* (2013.01);

(Continued)

(58) Field of Classification Search
CPC ........ B29C 39/18; B29C 67/247; F16L 9/123
See application file for complete search history.

(56) References Cited

U.S. PATENT DOCUMENTS

| 6,010,650 A | 1/2000 | Schmiade |
|---|---|---|
| 6,284,812 B1 | 9/2001 | Rotermund et al. |

(Continued)

FOREIGN PATENT DOCUMENTS

| DE | 28 03 708 A1 | 8/1979 |
|---|---|---|
| DE | 35 30 187 A1 | 3/1987 |

(Continued)

OTHER PUBLICATIONS

International Search Report and Written Opinion issued Mar. 22, 2013 in PCT/EP2012/073658 with English translation of categories of cited documents.

(Continued)

*Primary Examiner* — Alison L Hindenlang
(74) *Attorney, Agent, or Firm* — Oblon, McClelland, Maier & Neustadt, L.L.P.

(57) ABSTRACT

The present invention relates to a continuous process for producing insulated pipes comprising a conveying pipe, a jacketing pipe, a layer made of at least one polyurethane between conveying pipe and jacketing pipe, and a foil tube between the at least one polyurethane and the jacketing pipe, comprising at least the steps of (A) in a gripper-belt system, providing a foil tube formed continuously from a foil, and providing a conveying pipe, where the arrangement has the conveying pipe within the foil tube in such a way that an annular gap is formed between conveying pipe and foil tube, (B) charging a polyurethane system comprising at least one isocyanate component (a) and at least one polyol mixture (b) to the annular gap, (C) foaming the polyurethane system and allowing the same to harden, and (D) applying a layer made of at least one thermoplastic to the foil tube via extrusion, in order to form the jacketing pipe, which comprises using a multiple nozzle system having curvature corresponding to the radius of the annular gap to charge the material in step (B).

6 Claims, 1 Drawing Sheet

(51) Int. Cl.
*B29C 67/24* (2006.01)
*F16L 59/14* (2006.01)
*B32B 15/04* (2006.01)
*B32B 27/06* (2006.01)
*B32B 27/32* (2006.01)
*B32B 1/08* (2006.01)
*B29K 75/00* (2006.01)

(52) U.S. Cl.
CPC ............... *F16L 9/14* (2013.01); *F16L 59/143* (2013.01); *B29K 2075/00* (2013.01); *B32B 2597/00* (2013.01)

(56) References Cited

U.S. PATENT DOCUMENTS

| | | |
|---|---|---|
| 2010/0098891 A1* | 4/2010 | Grieser-Schmitz .............. B29C 44/1242 428/36.5 |
| 2012/0125562 A1 | 5/2012 | Mohmeyer et al. |
| 2012/0196066 A1 | 8/2012 | Grieser-Schmitz et al. |
| 2012/0244303 A1 | 9/2012 | Tomasi et al. |

FOREIGN PATENT DOCUMENTS

| | | |
|---|---|---|
| DE | 197 42 012 A1 | 3/1999 |
| EP | 0 865 893 A2 | 9/1998 |
| EP | 0 897 788 A1 | 2/1999 |
| EP | 0 960 723 A2 | 12/1999 |
| EP | 1 552 915 A2 | 7/2005 |
| EP | 1 783 152 A2 | 5/2007 |
| EP | 2 305 443 A1 | 4/2011 |

OTHER PUBLICATIONS

U.S. Appl. No. 13/655,967, filed Oct. 19, 2012, Carsten Ellersiek.
U.S. Appl. No. 13/597,548, filed Aug. 29, 2012, Christof Grieser-Schmitz, et.
U.S. Appl. No. 13/923,959, filed Jun. 21, 2013, Grieser-Schmitz et al.
U.S. Appl. No. 13/920,356, filed Jun. 18, 2013, Grieser-Schmitz, et al.

* cited by examiner

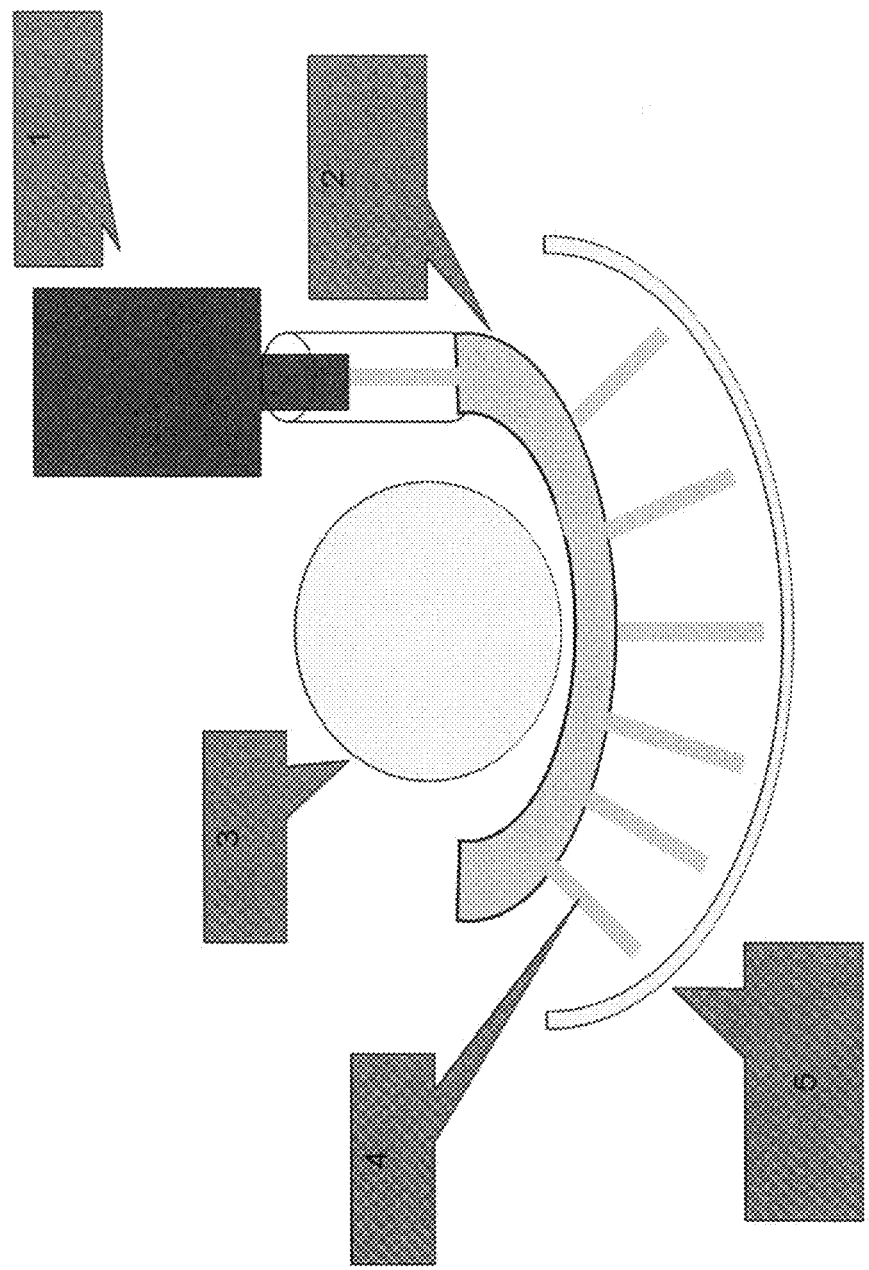

PROCESS FOR PRODUCING INSULATED JACKETED PIPES BY A CONTINUOUS PRODUCTION PROCESS

The present invention relates to a continuous process for producing insulated pipes comprising a conveying pipe, a jacketing pipe, a layer made of at least one polyurethane between conveying pipe and jacketing pipe, and a foil tube between the at least one polyurethane and the jacketing pipe, comprising at least the steps of (A) in a gripper-belt system, providing a foil tube formed continuously from a foil, and providing a conveying pipe, where the arrangement has the conveying pipe within the foil tube in such a way that an annular gap is formed between conveying pipe and foil tube, (B) charging a polyurethane system comprising at least one isocyanate component (a) and at least one polyol mixture (b) to the annular gap, (C) foaming the polyurethane system and allowing the same to harden, and (D) applying a layer made of at least one thermoplastic to the foil tube via extrusion, in order to form the jacketing pipe, which comprises using a multiple nozzle system having curvature corresponding to the radius of the annular gap to charge the material in step (B).

Pipes insulated with polyurethane foams are known in the prior art and are described by way of example in EP-A-865 893 and DE-A-197 42 012. Insulated pipeline systems are assembled from individual pipe segments. The standard procedures here use pipe lengths of 6 m, 12 m, and 16 m. Necessary additional lengths are manufactured separately or are cut to size from existing semifinished product. The individual pipe segments are welded and the existing sleeve technique is then used to apply insulation in the region of the weld. These sleeve connections are more susceptible to damage than the actual pipe product. This difference results from the fact that the pipe lengths are produced under defined, controllable conditions in production facilities. The sleeve connections are often produced in situ at the construction site under time pressure with exposure to wind and weather. The quality of the sleeve connections is often affected by, for example, temperature, contamination, and moisture. Furthermore, the number of sleeve connections is a major factor in the costs of installation of pipeline systems.

It is therefore desirable, in the pipe-processing industry, to minimize the number of sleeve connections installed, based on the length of a line. This is achieved by using relatively long individual pipe segments, but production of these is more demanding and frequently leads to technical problems.

Most individual pipes are produced by batchwise pipe-in-pipe production. In this process, the conveying pipe, generally made of steel, is provided with star-shaped spacers which serve to center the interior pipe. The conveying pipe is inserted into the exterior jacketing pipe, generally made of polyethylene, in such a way as to give an annular gap between the two pipes. Polyurethane foam is charged to said annular gap, because this has excellent insulation properties. To this end, the slightly inclined double pipe is provided with end caps, equipped with static ventilation holes. A polyurethane metering machine is then used to charge the liquid reaction mixture to the annular gap, and this mixture continues to flow downward in liquid form within the gap between the pipes until the reaction begins. From this juncture, the viscosity of the foam slowly rises, and the distribution process continues by virtue of flow of the foam, until reaction of the material is complete.

EP 1 552 915 A2 discloses a process for producing insulated pipes where a polyurethane system comprising an isocyanate component and a polyol component with low viscosity smaller than 3000 mPas is charged to the annular gap formed by conveying pipe and jacketing pipe. After the charging procedure, the polyurethane system foams and simultaneously cures.

EP 1 783 152 A2 likewise discloses a process for producing insulated pipes where a polyurethane system comprising an isocyanate component and a polyol component with particularly low viscosity of less than 1300 mPas is charged to the annular gap formed by conveying pipe and jacketing pipe.

EP 1 552 915 A2 and EP 1 783 152 A2 accordingly describe processes for producing insulated pipes in which the problem of complete filling of the pipe prior to foaming and hardening is solved by using polyol components with particularly low viscosity and therefore good flowability.

Another important factor for the quality of the pipes is uniform density distribution in the foam. However, this quality is not advantageous when the processes known from the prior art are used. The resultant density is usually lower at the ends and higher in the middle of the pipe. As the length of the pipe increases, the required overall density of the foam in the annular gap increases, for reasons of production technology.

Another essential factor for uniform density distribution is that the liquid polyurethane system is introduced uniformly into the annular gap between jacketing pipe and conveying pipe. The processes known from the prior art cannot necessarily ensure uniform distribution.

A disadvantage of continuous processes known from the prior art is that large amounts of polyurethane-precursor mixture have to be introduced continuously into a moving double pipe formed from conveying pipe and jacketing pipe, which is formed by joining an elongate foil. It is sometimes not possible to convey said mixture onward at sufficient speed, and the foam can therefore escape from the front of the pipe.

It was an object of the invention to provide a continuous process for producing insulated pipes, where pipes are obtained which feature low and uniformly distributed overall density, and also small cell diameters of the resultant polyurethane foam, and therefore low thermal conductivity. Another object of the present invention is to provide a process which ensures that the polyurethane system introduced does not escape laterally from the resultant pipe but instead remains completely within the annular gap. Another intention is to obtain an insulated pipe which has a particularly uniform density distribution of the polyurethane foam to the greatest possible extent over the entire length.

Said objects are achieved in the invention via a continuous process for producing insulated pipes comprising a conveying pipe, a jacketing pipe, a layer made of at least one polyurethane between conveying pipe and jacketing pipe, and a foil tube between the at least one polyurethane and the jacketing pipe, comprising at least the following steps:

(A) in a gripper-belt system, providing a foil tube formed continuously from a foil, and providing a conveying pipe, where the arrangement has the conveying pipe within the foil tube in such a way that an annular gap is formed between conveying pipe and foil tube, (B) charging a polyurethane system comprising at least one isocyanate component (a) and at least one polyol mixture (b) to the annular gap, (C) foaming the polyurethane system and allowing the same to harden, and (D) applying a layer made of at least one thermoplastic to the foil tube via extrusion, in order to form the jacketing pipe, which comprises using a multiple nozzle system having curvature corresponding to the radius of the annular gap to charge the material in step (B).

The process of the invention is carried out continuously. This means in particular that each individual step of the process is carried out continuously.

A detailed explanation is provided below of the individual steps of the process of the invention.

Step (A):

Step (A) of the process of the invention comprises, in a gripper-belt system, providing a foil tube formed continuously from a foil, and providing a conveying pipe, where the arrangement has the conveying pipe within the foil tube in such a way that an annular gap is formed between conveying pipe and foil tube.

The arrangement of the conveying pipe, the diameter of which in the invention is smaller than that of the foil tube and than that of the jacketing pipe formed in step (D) of the process of the invention, within the jacketing pipe, is such that an annular gap is formed between conveying pipe and jacketing pipe. The polyurethane system is charged to said annular gap in step (B) of the invention.

The conveying pipe used in the invention is generally a steel pipe with external diameter of, for example, from 1 to 120 cm, preferably from 4 to 110 cm. The length of the conveying pipe is, for example, from 1 to 24 meters, preferably from 6 to 16 meters. In one preferred embodiment of the process of the invention, the conveying pipe used comprises a wind-and-fold metal sheet.

In the continuous conduct of the process of the invention, the conveying pipe is provided, for example, in the form of material on a roll. It is also possible to provide the conveying pipe in linear form.

In step (A) of the process of the invention, in a gripper-belt system, a foil tube formed continuously from a foil is provided, and a conveying pipe is provided.

To this end, it is preferable to unwind an elongate foil continuously from a roll and to use processes known to the person skilled in the art, for example welding, to join said foil to give a foil tube. In one preferred embodiment of the process of the invention, said joining takes place in the gripper-belt system within which the conveying pipe is also continuously introduced. The foil is preferably introduced here by way of a shaping guide or foil guide. It is preferable to form a circular foil tube.

The width of the foil used in the invention is preferably suitable for forming an appropriate foil tube which has an internal diameter that is generally from 6 to 140 cm, preferably from 10 to 120 cm. Said foil is preferably provided in the form of material on a roll.

The foil used in the invention can be composed of any material that appears to the person skilled in the art to be suitable, for example polyethylene.

The thickness of the foil used in the invention is generally any thickness that appears to the person skilled in the art to be suitable, for example from 5 μm to 10 μm.

Step (A) of the process of the invention is preferably carried out at a temperature which permits joining of the edges of the foil to give an appropriate foil tube. It is preferable in the invention that an appropriate temperature is present only at the point at which the foil is joined to give a tube and that the remainder of step (A) is carried out at a temperature of from 10° C. to 30° C., for example ambient temperature.

A gripper-belt system used in the invention is known per se to the person skilled in the art. This generally involves two circulating caterpillar systems, bearing aluminum shaping jaws as required by the dimensions of the pipe. Said aluminum jaws are, for example, pipe half-shells which when they meet form the complete cross section of the pipe. By way of example, there are up to 180 individual segments incorporated within each circulating caterpillar.

The arrangement of the conveying pipe within the foil tube in step (A) of the process of the invention is such that an annular gap is formed between conveying pipe and foil tube. It is particularly preferable here that the arrangement has the conveying pipe centrally in the, preferably, circular, foil tube, so that a concentric annular gap is formed.

Step (B):

Step (B) of the process of the invention comprises the charging of a polyurethane system comprising at least one isocyanate component (a) and at least one polyol mixture (b) to the annular gap, where the charging procedure in step (B) uses a multiple nozzle system having curvature corresponding to the radius of the annular gap.

In the invention, the charging procedure for the polyurethane system in step (B) of the process of the invention uses a multiple nozzle system having curvature corresponding to the radius of the annular gap.

In one possible embodiment of the invention, the multiple nozzle system used is by way of example a piece of pipe which has been curved to correspond to the radius, preferably to correspond to the average radius, of the gap between the pipes. The expression "average radius" means in the invention a radius which lies between the radius of the conveying pipe and the radius of the foil tube, preferably a radius corresponding to the average value of the radius of the conveying pipe and the radius of the foil tube, with possible deviation by 20%, preferably 10%, upward and downward from said average value. In the invention, the pipe having corresponding curvature has at least one aperture for introducing the polyurethane system into the annular gap. In another preferred embodiment, the pipe having corresponding curvature has from 1 to 40, preferably from 2 to 30, particularly preferably from 2 to 20, apertures. The apertures can be of any type known to the person skilled in the art, but the intention here is to ensure that the polyurethane system used in the invention can be charged through the apertures into the annular gap. Examples of suitable apertures are slits and holes.

The present invention therefore preferably provides the process of the invention where the multiple nozzle system is formed from a pipe having curvature corresponding to the radius, preferably to the average radius, of the annular gap, and having at least one aperture for introducing the polyurethane system into the annular gap.

The length of the pipe having curvature according to the invention corresponding to the radius of the annular gap depends on the diameters of the conveying pipe and of the foil tube. The pipe preferably has circular curvature. The length of the pipe having circular curvature can generally be described by way of the annular-gap arc section comprised by the curved pipe. In one preferred embodiment, the curved pipe comprises an arc section of from 20 to 180°, preferably from 30 to 170°, particularly preferably from 40 to 160°, for example one third of a full circle, of the annular gap. An arc section of, for example, 180° here corresponds to one half of a full circle, and an arc section of, for example, 90° corresponds to one quarter of a full circle.

The apertures present in the pipe can generally point in any direction that appears to the person skilled in the art to be suitable. In one preferred embodiment of the process of the invention, the arrangement has the apertures of the multiple nozzle system in such a way that the polyurethane system is charged in the direction of the foil tube. It is possible in the invention, but less preferred, that the arrangement has the apertures of the multiple nozzle system in such a way that the polyurethane system is charged in the direction of the conveying pipe.

In the invention, the multiple nozzle system used in the invention has all of the apparatuses necessary for operation, for example in- and outlet lines, in particular for supplying the polyurethane system. It is preferable that the multiple nozzle system of the invention is attached to a mixing head known to the person skilled in the art.

In one preferred embodiment of the process of the invention, the conveying pipe is introduced continuously, and a foil which, via welding, forms the foil tube is likewise introduced continuously, and mutually superposed on a gripper-belt system for the welding procedure, and the arrangement has, in the vicinity of the gripper-belt system, preferably within the annular gap that is formed, the multiple nozzle system used in the invention. This arrangement ensures that the polyurethane system charged is distributed particularly uniformly, and that no material escapes from, or drips from, the annular gap.

In step (B) of the process of the invention it is generally possible to use any polyurethane system that appears to the person skilled in the art to be suitable. Polyurethane systems used with preference are explained in detail below.

Isocyanate component (a) used comprises the usual aliphatic, cycloaliphatic, and in particular aromatic di- and/or polyisocyanates. It is preferable to use tolylene diisocyanate (TDI), diphenylmethane diisocyanate (MDI), and in particular a mixture of diphenylmethane diisocyanate and polyphenylene polymethylene polyisocyanates (crude MDI). The isocyanates can also have been modified, for example via incorporation of uretdione groups, carbamate groups, isocyanurate groups, carbodiimide groups, allophanate groups, and in particular urethane groups.

It is also possible to use isocyanate component (a) in the form of polyisocyanate prepolymers. These prepolymers are known from the prior art. They are produced in a manner known per se, by reacting polyisocyanates (a) described above, for example at temperatures of about 80° C., with compounds having hydrogen atoms reactive toward isocyanates, preferably with polyols, to give polyisocyanate prepolymers. The polyol:polyisocyanate ratio is generally selected in such a way that the NCO content of the prepolymer is from 8 to 25% by weight, preferably from 10 to 22% by weight, particularly preferably from 13 to 20% by weight.

It is particularly preferable in the invention to use crude MDI as isocyanate component (a).

In one preferred embodiment, isocyanate component (a) is selected in such a way that its viscosity is less than 800 mPas, preferably from 100 to 650 mPas, particularly preferably from 120 to 400 mPas, in particular from 180 to 350 mPas, measured in accordance with DIN 53019 at 20° C.

For the purposes of this invention it is preferable that the polyurethane systems and polyurethane foams of the invention are in essence free from isocyanurate groups. The ratio isocyanurate group:urethane group in the foam is preferably smaller than 1:10, particularly preferably smaller than 1:100. In particular, there are in essence no isocyanurate groups present in the polyurethane foam used in the invention.

The polyol mixture (b) in the polyurethane system used in the invention generally comprises polyols as constituent (b1), and optionally chemical blowing agents as constituent (b2). The polyol mixture (b) generally comprises physical blowing agents (b3).

The viscosity of the polyol mixture (b) used in the invention (but without physical blowing agents (b3)) is generally from 200 to 10 000 mPas, preferably from 500 to 9500 mPas, particularly preferably from 1000 to 9000 mPas, very particularly preferably from 2500 to 8500 mPas, in particular from 3100 to 8000 mPas, measured in each case in accordance with DIN 53019 at 20° C. In one particularly preferred embodiment, the process of the invention uses a polyol mixture (b) (but without physical blowing agents (b3)) of which the viscosity is more than 3000 mPas, for example from 3100 to 8000 mPas, measured in each case in accordance with DIN 53019 at 20° C.

The present invention therefore preferably provides the process of the invention where a polyol mixture (b) (but without physical blowing agents (b3)) is used of which the viscosity is more than 3000 mPas, for example from 3100 to 8000 mPas, in each case measured in accordance with DIN 53019 at 20° C.

The polyol mixture (b) generally comprises physical blowing agents (b3). However, the addition of physical blowing agent causes a significant lowering of viscosity. An essential point in the invention means therefore that the statements made above relating to the viscosity of the polyol mixture (b) refer to the viscosity of the polyol mixture (b) without addition of physical blowing agents (b3), even when the mixture comprises physical blowing agents.

Polyols (constituent b1) that can be used are generally compounds having at least two groups reactive toward isocyanate, i.e. having at least two hydrogen atoms reactive toward isocyanate groups. Examples of these are compounds having OH groups, SH groups, NH groups, and/or $NH_2$ groups.

Preferred polyols (constituent b1) used are compounds based on polyesterols or on polyetherols. The functionality of the polyetherols and/or polyesterols is generally from 1.9 to 8, preferably from 2.4 to 7, particularly preferably from 2.9 to 6.

The hydroxy number of the polyols (b1) is generally greater than 100 mg KOH/g, preferably greater than 150 mg KOH/g, particularly preferably greater than 200 mg KOH/g. An upper limit which has proven successful for the hydroxy number is generally 1000 mg KOH/g, preferably 800 mg KOH/g, particularly 700 mg KOH/g, very particularly 600 KOH/g. The OH numbers stated above relate to the entirety of the polyols (b1), and this does not exclude the possibility that individual constituents of the mixture have higher or lower values.

It is preferable that component (b1) comprises polyether polyols, where these are produced by known processes, for example via anionic polymerization with alkali metal hydroxides, such as sodium hydroxide or potassium hydroxide, or with alkali metal alcoholates, such as sodium methoxide, sodium ethoxide, or potassium ethoxide, or potassium isopropoxide, as catalysts, and with addition of at least one starter molecule which comprises from 2 to 8, preferably from 3 to 8, reactive hydrogen atoms, or via cationic polymerization with Lewis acids, such as antimony pentachloride, boron fluoride etherate, etc., or bleaching earth, as catalysts, starting from one or more alkylene oxides having from 2 to 4 carbon atoms in the alkylene moiety.

Examples of suitable alkylene oxides are tetrahydrofuran, propylene 1,3-oxide, butylene 1,2- or 2,3-oxide, styrene oxide, and preferably ethylene oxide and propylene 1,2-oxide. The alkylene oxides can be used individually, in alternation, or in the form of a mixture.

Starter molecules that can be used are alcohols, such as glycerol, trimethylolpropane (TMP), pentaerythritol, sucrose, or sorbitol, or else amines, such as methylamine, ethylamine, isopropylamine, butylamine, benzylamine, aniline, toluidine, toluenediamine, naphthylamine, ethylenediamine (EDA), diethylenetriamine, 4,4'-methylenedianiline, 1,3-propanediamine, 1,6-hexanediamine, ethanolamine, diethanolamine, triethanolamine, and the like.

Other starter molecules that can be used are condensates of formaldehyde, phenol, and diethanolamine or ethanolamine, formaldehyde, alkylphenols, and diethanolamine or ethanolamine, formaldehyde, bisphenol A, and diethanolamine or ethanolamine, formaldehyde, aniline, and diethanolamine or ethanolamine, formaldehyde, cresol, and diethanolamine or ethanolamine, formaldehyde, toluidine, and diethanolamine or ethanolamine, or else formaldehyde, toluenediamine (TDA), and diethanolamine or ethanolamine; similar compounds can also be used.

Starter molecules preferably used are glycerol, sucrose, sorbitol, and EDA.

The polyol mixture can moreover optionally comprise chemical blowing agents as constituent (b2). Preferred chemical blowing agents are water and carboxylic acids, and formic acid is particularly preferred as chemical blowing agent. The amount generally used of the chemical blowing agent is from 0.1 to 5% by weight, in particular from 1.0 to 3.0% by weight, based on the weight of component (b).

As mentioned above, the polyol mixture (b) generally comprises a physical blowing agent (b3). These are compounds emulsified or dissolved in the starting materials for polyurethane production, and they vaporize under the conditions of polyurethane formation. By way of example, they involve hydrocarbons, such as cyclopentane, halogenated hydrocarbons, and other compounds such as perfluorinated alkanes, e.g. perfluorohexane, fluorochlorocarbons, or else ethers, esters, ketones, and/or acetals. The amount usually used of these, based on the total weight of components (b), is from 1 to 30% by weight, preferably from 2 to 25% by weight, particularly preferably from 3 to 20% by weight.

The present invention therefore preferably provides the process of the invention where the polyurethane system is foamed with cyclopentane as physical blowing agent.

In one preferred embodiment, the polyol mixture (b) comprises, as constituent (b4), crosslinking agents. Crosslinking agents are compounds of molar mass from 60 to less than 400 g/mol, having at least 3 hydrogen atoms reactive toward isocyanates. Glycerol is an example here.

The amount generally used of the crosslinking agents (b4) is from 1 to 10% by weight, preferably from 2 to 6% by weight, based on the total weight of the polyol mixture (b) (but without physical blowing agents (b3)).

In another preferred embodiment, the polyol mixture (b) comprises, as constituent (b5), chain extenders, where these serve to increase the density of crosslinking. Chain extenders are compounds of molar mass from 60 to less than 400 g/mol, having 2 hydrogen atoms reactive toward isocyanates. Examples here are butanediol, diethylene glycol, dipropylene glycol, and also ethylene glycol.

The amounts generally used of the chain extenders (b5) are from 2 to 20% by weight, preferably from 4 to 15% by weight, based on the total weight of the polyol mixture (b) (but without physical blowing agents (b3)).

Components (b4) and (b5) can be used individually or in combination in the polyol mixture.

The polyurethane foams present as insulating material in the invention are obtainable via reaction of the polyurethane system of the invention.

The amounts reacted during the reaction of the polyisocyanates (a) and the polyol mixture (b) are generally such that the isocyanate index of the foam is from 90 to 240, preferably from 90 to 200, particularly preferably from 95 to 180, very particularly preferably from 95 to 160, in particular from 100 to 149.

In one preferred embodiment, components (a) and (b) of the polyurethane system are selected in such a way that the compressive strength of the resultant foam (for density 60 kg/m$^3$) is greater than 0.2 N/mm$^2$, preferably greater than 0.25 N/mm$^2$, particularly preferably greater than 0.3 N/mm$^2$, measured in accordance with DIN 53421.

The overall shot density in the process of the invention is generally less than 80 kg/m$^3$, preferably less than 75 kg/m$^3$, particularly preferably less than 70 kg/m$^3$, very particularly preferably less than 65 kg/m$^3$, in particular less than 60 kg/m$^3$. The overall shot density generally means the total amount of liquid polyurethane material charged, based on the total volume of the foam-filled annular gap.

The process of the invention can generally take place at any compaction level that appears to the person skilled in the art to be suitable. Compaction level means the quotient calculated from the overall density of the material charged to the annular gap divided by the free-foamed core density determined on an uncompacted foam.

It is preferable that the present invention provides the process of the invention where the reaction is carried out with a compaction level smaller than 4.0, preferably smaller than 3.5, particularly preferably smaller than 3.0, and very particularly preferably smaller than 2.5.

The polyurethane system used in step (B) of the process of the invention preferably comprises a catalyst. It is generally possible in the invention to use any of the catalysts that appear to the person skilled in the art to be suitable.

Catalysts preferably used in the invention catalyze the blowing reaction, i.e. the reaction of diisocyanate with water. This reaction takes place predominantly prior to actual polyurethane-chain formation, i.e. prior to the polymerization reaction, and therefore gives the polyurethane system a fast reaction profile.

Examples of catalysts that can be used in the invention are those selected from the group consisting of organotin compounds, such as tin(II) salts of organic carboxylic acids, and/or basic amine compounds, preferably tertiary amines, such as triethylamine, and/or 1,4-diazabicyclo[2.2.2]octane, potassium acetate, potassium formate, and/or potassium octoate, glycine, N4(2-hydroxy-5-nonylphenyl)methyl)-N-methyl monosodium salt (CAS number 56968-08-2), (2-hydroxypropyl)-trimethylammonium 2-ethylhexanoate (CAS number 62314-22-1), 1-propylammonium-2-hydroxy-N,N-trimethyl formate, trimethylhydroxypropyl-ammonium formate, 2-((2-(dimethylamino)ethyl)methylamino)ethanol (CAS number 2212-32-0), and/or N,N',N"-tris(dimethylaminopropyl)hexahydrotriazine (CAS number 15875-13-5), and mixtures thereof.

The catalysts preferred in the invention can be added to the polyurethane system in any manner known to the person skilled in the art, for example in bulk or in the form of solution, for example in the form of aqueous solution.

The amount added of the at least one catalyst in the invention, based on polyol components (b), is from 0.01 to 1.5% by weight, preferably from 0.05 to 1.0% by weight, particularly preferably from 0.05 to 0.5% by weight, very particularly preferably from 0.1 to 0.3% by weight.

It is also optionally possible to add additional substances (b6) to the polyurethane system used in the invention. Additional substances (b6) are the usual auxiliaries and additional substances known in the prior art, but without physical blowing agents. Examples that may be mentioned are surfactant substances, foam stabilizers, cell regulators, fillers, dyes, pigments, flame retardants, antistatic agents, hydrolysis stabilizers, and/or substances having fungistatic and bacteriostatic action. It should be noted that the general and preferred viscosity ranges stated above for component (b) refer to a polyol mixture (b) inclusive of any additional substances (b6) added (but exclusive of optional physical blowing agent (b3) added).

The present invention therefore preferably provides the process of the invention where the at least one polyol mixture (b) comprises polyols (b1), optionally chemical blowing agents (b2), physical blowing agents (b3), crosslinking agents (b4), chain extenders (b5), and/or optionally additional substances (b6).

The present invention therefore in particular provides the process of the invention where from 1 to 25% by weight of flame retardant, based on the total weight of the polyol mixture, is used as additional substance (b6).

Step (C):

Step (C) of the process of the invention comprises the foaming of the polyurethane system and allowing same to harden.

The foaming and hardening in the invention generally takes place at a component temperature of from 18 to 35° C., preferably from 20 to 30° C., particularly preferably from 22 to 28° C.

The foaming and hardening in the invention generally takes place at surface temperatures of from 15 to 50° C., preferably from 20 to 50° C., particularly preferably from 25 to 45° C.

In step (C) of the process of the invention, gaseous substances arising under the reaction conditions during the reaction, and/or blowing agents, optionally escape through the open ends of the pipe produced.

Step (C) of the process of the invention gives an insulated pipe comprising at least one conveying pipe, one foil tube, and one insulating layer made of polyurethane foam between conveying pipe and foil tube.

The thickness of the insulating layer is generally from 1 to 20 cm, preferably from 5 to 20 cm, particularly preferably from 7 to 20 cm.

In another preferred embodiment, the thermal conductivity of the insulating layer comprising polyurethane foam is less than 27 mW/mK, preferably from 22 to 26.7 mW/mK, measured in accordance with EN ISO 8497.

Step (D):

Step (D) of the process of the invention comprises applying a layer made of at least one thermoplastic to the foil tube via extrusion, in order to form the jacketing pipe.

Step (C) of the process of the invention gives a conveying pipe surrounded by an insulating layer made of at least one polyurethane foam, surrounded in turn by the foil tube produced in step (A). In order to form the jacketing pipe made of at least one thermoplastic, said pipe is applied via extrusion in step (D) of the process of the invention.

The extrusion of thermoplastics to produce a layer, in this case the jacketing pipe, is known per se to the person skilled in the art.

The application procedure in step (D) of the process of the invention is generally carried out at a temperature which appears suitable to the person skilled in the art of extrusion of thermoplastics, for example a temperature higher than the melting point of the thermoplastic used. Examples of suitable temperatures are from 180 to 220° C., preferably from 190 to 230° C.

The thickness of the jacketing pipe formed in step (D) of the process of the invention is generally from 1 to 30 mm. The internal diameter of the jacketing pipe depends in the invention on the diameter of the foil tube and by way of example is from 6 to 140 cm, preferably from 10 to 120 cm.

The jacketing pipe can optionally be composed of a plurality of layers, where these can be joined during the extrusion procedure for producing the jacketing pipe. An example here is the introduction of multiple-ply foils between polyurethane foam and jacketing pipe, where the foil comprises at least one metallic ply in order to improve barrier effect. EP-A-960 723 describes suitable jacketing pipes of this type. Said additional layer optionally present is preferably introduced before the end of step (A), together with the foil. By way of example, multiple-ply foils with aluminum as diffusion barrier can be used in the invention.

Any of the thermoplastics which have properties advantageous for an appropriate insulated pipe are generally suitable in the invention. Examples of thermoplastics that can be used in the invention are those selected from the group consisting of polyethylene, polypropylene, and mixtures thereof, and it is preferable to use polyethylene.

After step (D) of the process of the invention, the insulated pipe formed can be further treated by processes known to the person skilled in the art, for example via cutting-to-size of the insulated pipe, which has been produced continuously and is therefore in principle continuous, to give desired lengths, for example 6, 12, or 75 m.

In one particularly preferred embodiment, the insulated pipe produced in the invention is an insulated composite jacketed pipe which is suitable for underground district-heating networks and which complies with the requirements of DIN EN 253:2009.

The present invention also provides an insulated pipe which can be produced via the process of the invention. The details mentioned for the insulated pipe produced in relation to the process of the invention apply correspondingly. The pipe produced in the invention features particularly uniform density distribution over the entire length and therefore low lambda values for far better physical properties.

The present invention also provides an apparatus for producing an insulated pipe, comprising an apparatus for introducing a conveying pipe, an apparatus for introducing a foil for forming a foil tube, a gripper-belt system, an apparatus for extruding the at least one plastic, and a multiple nozzle system having curvature corresponding to the radius of the annular gap between conveying pipe and foil tube, preferably for carrying out the process of the invention.

The individual apparatuses mentioned are known per se to the person skilled in the art. These apparatuses known per se have to be arranged appropriately for the process of the invention.

The apparatus of the invention also comprises the multiple nozzle system of the invention. Details and preferred embodiments relating to this multiple nozzle system are mentioned in relation to the process of the invention, and these are also intended to apply to the apparatus of the invention.

The present invention also provides the use of the apparatus of the invention for carrying out the process of the invention, in particular for producing the insulated pipe of the invention.

FIGURE

FIG. 1 is a diagram of a distributor pipe of the invention in an annular gap derived from steel pipe and PE foil. The meanings of the reference symbols here are as follows:

1 Mixing head
2 Distributor pipe with varying number of holes, for example 6 holes
3 Steel pipe
4 Polyurethane foam
5 Supportive LD-PE foil

The invention claimed is:

1. A continuous process for producing insulated pipes comprising a conveying pipe, a jacketing pipe, a layer made of at least one polyurethane between conveying pipe and jacketing pipe, and a foil tube between the at least one polyurethane and the jacketing pipe, comprising:
   (A) in a gripper-belt system, providing a foil tube formed continuously from a foil, and providing a conveying pipe, wherein said pipes are arranged such that the conveying pipe is within the foil tube in such a way that an annular gap is formed between conveying pipe and foil tube,
   (B) charging a polyurethane system comprising at least one isocyanate component (a) and at least one polyol mixture (b) to the annular gap, using a multiple nozzle system having curvature corresponding to the radius of the annular gap,
   (C) foaming the polyurethane system and allowing the same to harden, and
   (D) applying a layer made of at least one thermoplastic to the foil tube via extrusion, in order to form the jacketing pipe,
   wherein said multiple nozzle system comprises an arch corresponding to a section of from 20 to 180° of said annular gap.

2. The process according to claim 1, wherein the multiple nozzle system is formed from a pipe having curvature corresponding to the radius of the annular gap and having at least one aperture for introducing the polyurethane system to the annular gap.

3. The process according to claim 1, wherein the arrangement of the apertures of the multiple nozzle system is such that the polyurethane system is charged in the direction of the foil tube.

4. The process according to claim 1, wherein the conveying pipe used comprises a wind-and-fold metal sheet.

5. The process according to claim 1, wherein the at least one thermoplastic used comprises polyethylene.

6. A method for continuously producing an insulated pipe comprising a conveying pipe, a jacketing pipe, a layer made of at least one polyurethane between conveying pipe and jacketing pipe, and a foil tube between the at least one polyurethane and the jacketing pipe, comprising:
   (A) in a gripper-belt system, providing a foil tube formed continuously from a foil introduced by an apparatus for introducing the foil, and providing a conveying pipe from an apparatus for introducing the conveying pipe, wherein said pipes are arranged such that the conveying pipe is within the foil tube in such a way that an annular gap is formed between conveying pipe and foil tube,
   (B) charging a polyurethane system comprising at least one isocyanate component (a) and at least one polyol mixture (b) to the annular gap, from a multiple nozzle system having a curvature corresponding to the radius of the annular gap,
   (C) foaming the polyurethane system and allowing the same to harden, and
   (D) applying a layer made of at least one thermoplastic to the foil tube via an apparatus for extruding, in order to form the jacketing pipe,
   wherein said multiple nozzle system comprises an arch corresponding to a section of from 20 to 180° of said annular gap.

* * * * *